Dec. 15, 1970 E. M. DAVIS, JR., ET AL 3,547,604

FUNCTIONAL COMPONENTS

Original Filed Aug. 8, 1963 3 Sheets-Sheet 1

INVENTORS
EDWARD M. DAVIS, JR.
ARTHUR H. MONES

BY Jason C. Bernard, Jr.
ATTORNEY

FUNCTIONAL COMPONENTS

Original Filed Aug. 8, 1963

United States Patent Office 3,547,604

Patented Dec. 15, 1970

3,547,604

FUNCTIONAL COMPONENTS

Edward M. Davis, Jr., Chappaqua, and Arthur H. Mones, Poughkeepsie, N.Y., assignors to International Business Machines Corporation, Armonk, N.Y., a corporation of New York Continuation of abandoned application Ser. No. 583,883, Oct. 3, 1966, which is a division of application Ser. No. 300,734, Aug. 8, 1963, now Patent No. 3,456,158. This application Sept. 15, 1969, Ser. No. 861,218

Int. Cl. B01j *17/00;* H01l *1/16*

U.S. Cl. 29—577 9 Claims

ABSTRACT OF THE DISCLOSURE

A continuous process for fabricating functional components. Conductive paths and passive elements are successively screened and fired to adhere to a substrate. Pluggable terminals are staked in the substrate prior to adjustment of an electrical parameter of one or more passive elements and thereafter the paths, at least a portion thereof, and terminals are coated with a metal alloy. Active elements are attached to selected sections in the paths to complete an electric circuit. The process steps are so selected and arranged to prevent conflict therebetween whereby the various circuit elements and the component will not be adversely affected as a result of succeeding process steps.

This is a continuation of application Ser. No. 583,883, filed Oct. 3, 1966, now abandoned, and a division of application Ser. No. 300,734, filed Aug. 8, 1963, now U.S. Pat. No. 3,456,158.

This invention relates to functional components and, more particularly, to methods of fabricating functional components.

Functional components are devices which include one or more active or passive electric circuit elements fabricated as an integrated structure and capable of performing functions or operations useful in an information handling system. Such systems may be visualized as being composed of a variety of data processing or logical routines which may be subdivided into two or three different basic operations, for example AND, OR, INVERT. Functional components or "building-block" circuits may be fabricated to perform these basic operations and be suitably interconnected to provide the arithmetic, logic and like operations required for such systems. Additionally, oscillators, modulators and other special circuits for information handling systems may also be packaged as a functional component and suitably connected in the system. Accordingly, functional components permit highly complex information handling systems to be designed, manufactured and maintained by the relatively simple task of interconnecting a plurality of components in a preferred arrangement, as described for example in U.S. Pats. 3,075,089, issued Jan. 22, 1963.

To fabricate high performance, versatile and minimum cost functional components for information handling systems, a structure is required that is readily suitable for a mass production technique which provides excellent reproducibility at commercially acceptable yields. The structure must also be rugged and reliable in the face of different temperature, humidity and vibration conditions encountered in information handling systems. The active and passive devices included in the structure must have close tolerance requirements to satisfy the high operational performance. From a cost standpoint, the structure should not require expensive device encapsulation or circuit interconnection and be easily connectable in the information handling system. Also, the structure assembly process must be a continuous process and must not present conflicts between the fabrication of different types of active and passive elements. A satisfactory solution of the previously mentioned requirements should provide functional components that will facilitate the design, manufacture and maintenance of highly complex information handling systems thereby making such systems more readily available to the business, governmental and scientific communities.

A general object of the invention is a functional component and method of fabrication amenable to mass production techniques and yet satisfying the performance and cost requirements of a highly complex information handling system.

One object is a graphic arts process for fabricating functional components.

Another object is a graphic arts process compatible with the formation of various passive circuit elements required in a functional component.

Another object is a functional component employing chip devices and film type passive elements in a high performance unit.

Another object is a pluggable functional component.

Still another object is a functional component including active and passive elements which do not require hermetically sealed headers for protection against the atmosphere.

These and other objects are accomplished in accordance with the present invention, one illustrative embodiment of which comprises the steps of preparing a substrate for graphic arts processing, printing on the surface of the substrate a unique metallic topology of selected noble metals, firing the substrate at a preselected temperature to establish a land pattern thereon, printing at discrete locations in the topology a film type resistor of noble metals dispersed in a glass matrix, said resistor having a magnitude less than the desired resistor value, the magnitude of the resistor being determined by the material and thickness of applications thereof, firing the substrate to solidify the resistor, securing a plurality of spaced terminal members in the substrate, said terminals being connected to selected areas of the printed metallic topology, printing reactive devices on the substrates, coating the metallic topology with a solder to insure good electrical connections between the terminals and the lands, trimming the passive elements to bring the elements up to a desired value, securing a chip device to the topology and positively spacing the device from the substrate and encapsulating the functional component in a suitable material to prevent possible damage to the passive and active elements whereby a functional component is produced wherein passive and active component elements are secured to the same substrate without deleterious effect from the fabrication process of any particular element and all passive element interconnections are formed simultaneously with the fabrication of the element. No special headers are required for any of the passive or active elements and the component is readily connectable to suitable utilization means.

One feature of the invention is a functional component of microminiaturized construction comprising film type passive devices and chip active devices secured to a substrate and electrically connected to pin terminals mechanically secured in the substrate.

Another feature is a functional component that has rugged and reliable interconnections between a printed circuit pattern and passive and active devices without the use of thermal compression bonding techniques.

Another feature is a functional component fabrication process that permits all types of passive and active devices of any desired device parameter to be interconnected in substantially any configuration to perform a suitable logic function for an information handling system.

Another feature is a graphic arts process for fabricating in sequence resistive and reactive circuit devices without deleterious effect to previously or subsequently completed devices.

Another feature is a graphic arts process for fabricating various microminiaturized passive circuit elements for miniaturized circuits whereby the parameters of the elements are readily adjusted by the selection of the materials and the thicknesses of deposition.

Another feature is a microminiaturized functional component having pluggable terminals and an appropriate graphic arts topology of a selected metal combination that provides low resistance electrical paths, good connection to the pluggable terminals and means for joining active devices to the topology.

Still another feature is a graphic arts process for fabricating passive elements and adjusting these elements' magnitude to a particular value by various tailoring means.

The foregoing and other objects, features and advantages of the invention will be apparent from the following more particular description of preferred embodiments of the invention as illustrated in the accompanying drawings.

Figure 1:
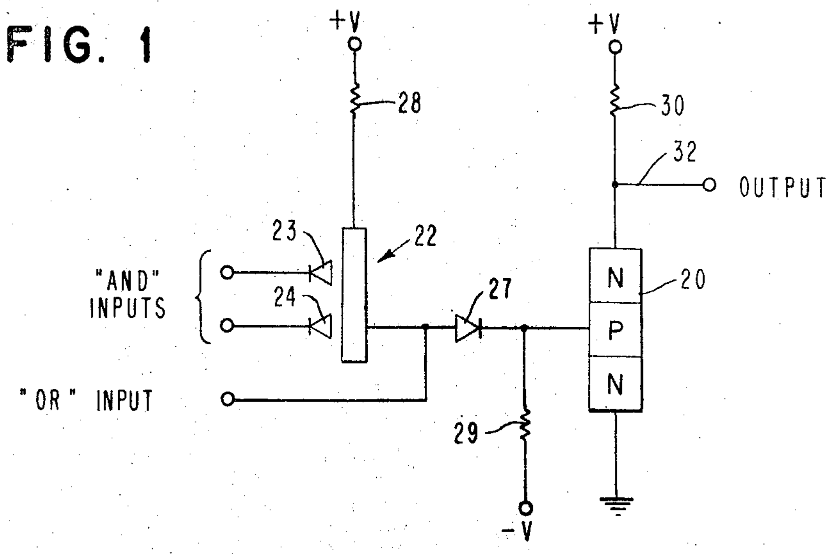
FIG. 1 is an electrical schematic of a circuit desired to be fabricated as a functional component.

The present invention permits functional components of any particular configuration and purpose to be fabricated. One functional component of widespread interest in information handling systems is an AND/OR inverter circuit shown in FIG. 1. The AND/OR inverter component will be described in the remaining paragraphs for reasons of convenience in explanation. It should be understood, however, that the present invention permits any functional component to be fabricated into a single complete package. Briefly, the AND/OR inverter circuit comprises a transistor 20 which cooperates with a diode gate 22 comprising diodes 23 and 24. The circuit also includes a diode 27 for the OR function. Also included in the circuit are suitable bias resistors 28 and 29. A load resistor 30 is connected in an output circuit 32. The operation of an equivalent circuit is described in U.S. Pat. 3,075,089 previously cited or any well-known engineering text. The remaining paragraphs of the description will describe the individual steps of fabricating the component and the component per se which will duplicate the function and operation of the circuit of FIG. 1.

Figure 2:
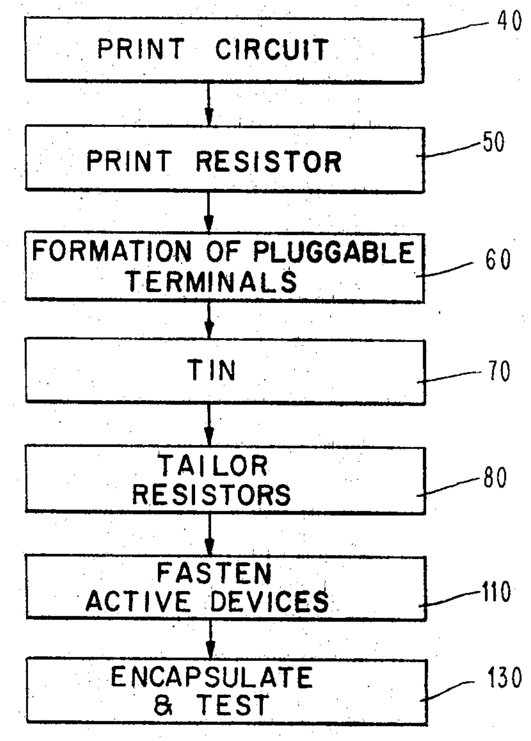
FIG. 2 is a flow diagram for fabricating the functional component of the present invention.

FIG. 2 discloses the flow chart for fabricating the circuit of FIG. 1. Each operation of the flow chart will be discussed in detail in connection with the remaining figures.

Figures 3, 4, 5, 6, 7:
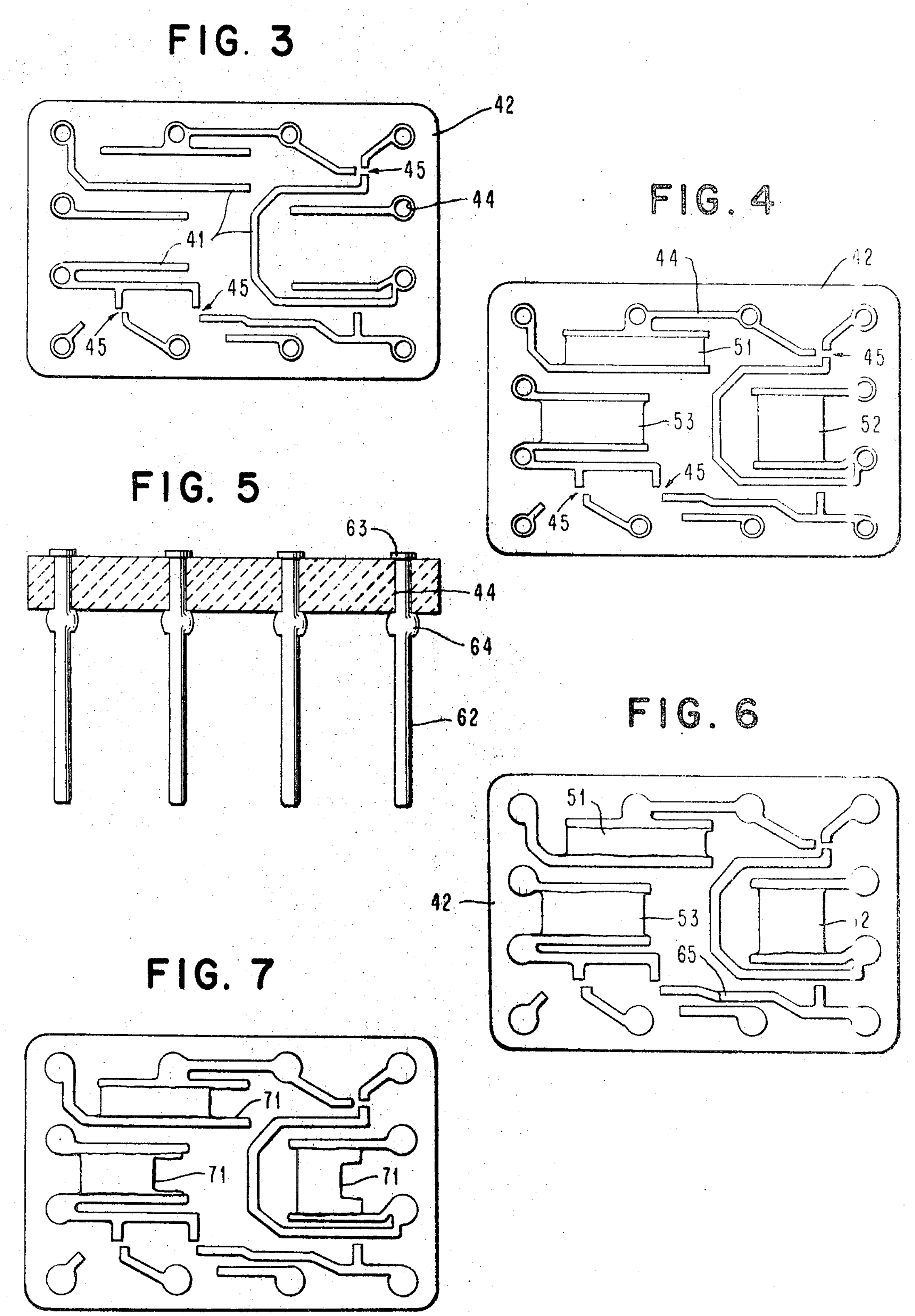
FIG. 3 is a top view of a substrate after printing of a unique circuit topology.
FIG. 4 is a top view of the substrate of FIG. 3 after printing of film resistors.
FIG. 5 is a side view of the substrate of FIG. 4 after installation of terminals.
FIG. 6 is a top view of the substrate of FIG. 5 after tinning.
FIG. 7 is a top view of the substrate of FIG. 6 after tailoring of the resistors.

The first operation in fabricating a functional component is printing 40 (see FIG. 2) a unique metallic circuit topology 41 on a substrate 42 shown in FIG. 3. The circuitry corresponds to that of FIG. 1, but it appears in a different form due to the limited area. The substrate may be any dimension, but for microminiaturized purposes a 0.455" x 0.455" x 0.06" thick parallelepiped has be enfound suitable. The substrate includes a plurality of apertures 44 about the periphery for pin terminal members which will be described in more detail hereinafter. The substrate should possess good thermal conductivity characteristics and be inert to relatively high firing temperatures. A good thermal conductivity characteristic is required due to the close spacing of passive and active elements which will be secured to the substrate as will appear hereinafter. One substrate material that satisfies the previously indicated requirements is a 95% alumina composition which has a thermal conductivity of approximately 12 B.t.u./hr./ft./degrees F. Alumina has also excellent electrical and high temperature properties.

Prior to printing a unique metallic circuit topology, the substrate is cleaned by immersion in trichloroethylene. The immersed substrate is placed in an ultrasonic cleaner for approximately five minutes. Upon removal, substrates are dried in warm air for approximately fifteen minutes.

After cleaning the unique metallic circuit topology 41 is printed. Metallizing inks, typically compositions of gold, silver and platinum, are employed in the printing process. One metallizing ink found to be satisfactory is described in expired U.S. Pat. 2,385,580, issued Sept. 26, 1945. The ink must have excellent adhesion properties to the substrate, as well as provide good electrical conductivity and soldering characteristics. The printing on the substrates is done by a conventional silk screening process. After formation of the unique circuit topology, the substrate is fired in a conventional oven at approximately 750–800° C. for a period of approximately thirty minutes. The final solidified conductors are approximately 5 to 10 mils in width and may be separated by an equal distance. It is especially important that the conductor line width be of the previously indicated dimensions in order to permit the number of circuit elements required for the desired functional component to be installed on the substrate. In connection with the circuit pattern, it should also be noted that spacings or fingers 45 occur between and in the various conductors. The fingers are reserved for the passive and active components which will be secured to the substrate as will appear hereinafter.

The next operation in the process is printing 50 (see FIG. 2) resistor elements 51, 52 and 53 on the substrate at the appropriate position in the circuit pattern as shown in FIG. 4. A conventional silk screen process is also employed to print the resistors 51, 52 and 53 on the substrate. The resistors are printed in relatively wide spaces between parallel or disposed conductor paths. The resistor composition is a metal-glass paste which is squeegeed onto the silk screen. Dispersed conductive insulating materials have good deposition and other properties. One composition found to have excellent reproducibility in the process is a palladium oxide-silver composition which is described in a previously filed application Ser. No. 267,-643, filed Mar. 25, 1963, and assigned to the same assignee as that of the present invention. The resistivity range of the previously mentioned composition may be varied from 50–50,000 ohms per square. Such changes are accomplished by varying the composition as described, for example, in the previously mentioned application. Alternatively, the thickness of application of the paste on the screen may be readily controlled by suitable silk screen apparatus.

Briefly, the process of silk screening involves the steps of selecting a proper screen which has a resistor configuration that corresponds to the proper position on the substrate when aligned therewith. The screening mask may be of various mesh depending upon the paste that will be employed to fabricate the resistor. Typically, a screen mesh of 105 to 200 is employed in the silk screen. After registration between the silk screen and substrate, a small amount of paste is transferred to a squeegee. The paste is applied to the substrate through the screen with the edge the squeegee. The screen is quickly pulled back from the substrate after the paste deposition to prevent further leakage to the substrate and the subsequent formation of irregularities in the resistor configuration. The screened substrates are placed in a suitable container and air dried for approximately thirty minutes. Following air drying, each substrate is checked for defects of smearing, bridging, poor definition, holes in the pattern and the finger spacing. The screened and air dried substrates are placed in a conventional oven at approximately 110° C. for a period of thirty minutes for drying purposes. The resistor paste thickness is measured and when satisfactory, a firing operation is next performed. It has been determined that a one micron difference in thickness changes the resistance almost 5%. Thus, the control of the paste thickness is especially important to the process.

Firing is performed in a moving belt furnace operated at approximately 800° C. with the substrates being fired for approximately fifty minutes. The belt speed of the furnace is determined by the range and average thickness of each resistor on the substrate. A resistance measurement test is performed on the fired substrates. The accepted resistors have been found to have good temperature humidity characteristics with no protective overcoat due to the glass coating.

Formation of pluggable terminals 60 (see FIG. 2) is the next step in the fabrication process. In FIG. 5 pin terminals 62 are inserted in the apertures 44 previously described in connection with FIG. 3. Each aperture is suitably positioned in one of the conductive paths 41 (see FIG. 3) as well as being spaced about the periphery of the substrate. The terminals 62 are approximately 230 mils long, 20 mils in diameter and 125 mils in spacing. Any number of materials may be employed for the terminals but copper has been found to be very satisfactory. The terminals may be inserted in the apertures by suitable apparatus. Thereafter, mechanical forces are applied to the pins to expand the metal above and below the aperture. The expanded metal sections 63 and 64 mechanically lock the pins in the apertures. The terminal metal should be relatively soft for the swaging operations as well as insertion into the apertures. It is believed apparent that if the copper is relatively hard the pins could snap and break off due to improper registration when inserted into the apertures. Also, swaging of the metal would be more difficult. FIG. 5 indicates that the pins are usually displaced slightly in one direction after insertion. The displacement is due to the spacing between the apertures being less accurate than that required for the pins spacing. Then when the pins are installed in the aperture, they are offset or coined by the forming die in order to provide the appropriate pin spacings. As a result the requirement for high spacing precision of the aperture in the substrate is removed. The pins therefore create the appearance of being slightly displaced with respect to the substrate. In any event, the installed pins now provide the means for plugging the substrate into a female connector.

A tinning operation 70 (see FIG. 2) is the next step in the process. The tinning provides good electrical connections between the pins 62 and the conductor lands 41. Further, the series resistance of the land is reduced and solder is provided for joining active elements to the substrates, as will be described hereinafter. Alternate methods, for example, plating may be employed to provide the same results as tinning. Prior to tinning, the substrates are ultrasonically cleaned. A flux remover and liquid degreaser are employed to ready the surface of the substrate conductors for the tinning operation. A high temperature solder is employed in the tinning operation in order that the substrate may be later soldered to a printed circuit board without melting the solder and thereby affecting any joints formed between the solder and circuit elements. One solder found to have the required characteristic is a 90% lead and 10% tin solder which has a melting temperature about 300° C. A dip solder process is employed to coat the conductive pattern of the substrate with solder. Solder 65, as shown in FIG. 6, does not adhere to the resistors 51, 52, 53 or the surface of the alumina substrate 42 due to their high glass-like content which is not wetted by the solder. After coating of the conductive pattern 41, the substrate is solder-dipped on the pin terminal side to point the ends thereof for ease of insertion into printed circuit boards. The entire tinning operation is suitable for automated techniques. Apparatus for performing such a tinning operation is described in the IBM Bulletin, July 1963, page 36.

Figure 8:
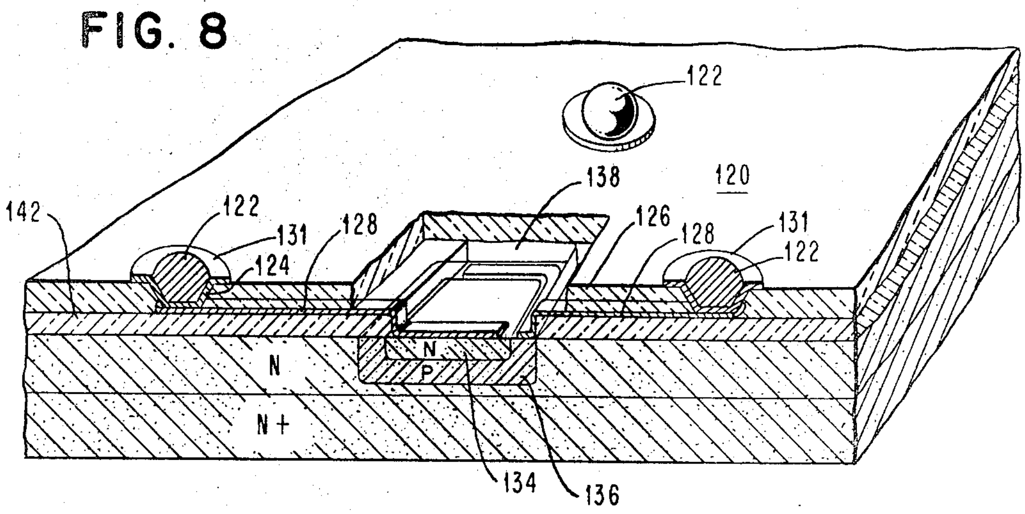
FIG. 8 is a partially broken away side view of a chip transistor which is subsequently secured to the substrate.

A resistor tailoring or trimming operation 80 (see FIG. 2) is next performed. The screened resistors on the substrate have a tolerance of approximately 15% at this point in the fabrication process. For close tolerance devices, the resistors may be trimmed to ±0.5% or better of desired magnitude. The resistor trimming is realized by an abrasion operation. Alternatively, trimming may also be accomplished by burning or grinding. Resistor trimming by abrasion will be described solely for reasons of convenience in explanation. The substrate is inserted in a fixture (not shown) that directs abrasive material through nozzles to each resistor. As the substrate moves under the nozzles, a path or notch 71 is cut into the resistor (see FIG. 7) which raises the resistor value. It should be noted that before the tailoring operation, the resistors have been fabricated with an average value 15% lower than the desired value. As the width of the resistor is reduced, the resistance value increases and approaches the desired value. A bridge circuit or equivalent measures the resistance value and properly turns off each nozzle as the resistance of the resistor approaches the desired value. Apparatus for trimming the resistors in accordance with the technique outlined above is described in more detail in the IBM Technical Disclosure Bulletin, February 1962, page 15. It should be noted that all resistor terminals are connected electrically to pins to facilitate resistance measurement. The design of the resistors 51, 52 and 53 prevents power limitations from being exceeded as their cross-sections are reduced. The next operation in the process is fastening chip or active devices 110 (see FIG. 2) to the substrate. A typical chip device 120 is shown in FIG. 8. The chip device is more fully described in a paper entitled "Hermetically Sealed Chip Diodes and Transistors" by J. R. Langdon, W. E. Mutter, R. P. Pecoraro and K. K. Schuegraf, which was presented to the 1961 Electron Device Meeting in Washington, D.C. on Oct. 27, 1961. Typically, the chip component 120 is of the order of 25 mils x 25 mils square. Metal alloy contacts 122 are built-up spherical or ball-like in form but need not be limited to such configuration. The ball contacts are positioned in openings 124 in a glass 126 covering the device 120. The glass coating eliminates the necessity for expensive and bulky encapsulation means as described in the Electron Device paper. Before positioning the balls in the openings, a metal film 131 is deposited therein. The film has good adhesion to the glass and underlying metal strip 128 which connects to chip electrodes 134 and 136 through opening 138 in an insulating member 142. After positioning the balls in the openings 124, the component is rapidly heated to join the balls 128 to the film 131 thereby establishing a good electrical and mechanical connection between the balls and the electrodes. The chip devices may be either transistors or diodes as indicated in the Electron Device article. The circuit of FIG. 1 employs both. A transistor has been selected for descriptive purposes in the present application solely for reasons of convenience in explanation. It is believed apparent that the chip devices are fabricated in a separate process apart from the present invention but concurrently therewith. The devices when installed on the substrate provide a high performance element which is not affected by subsequent processing operations.

Figure 9:
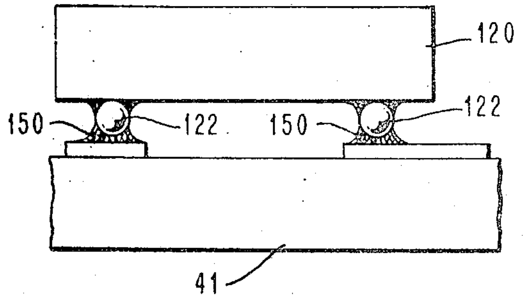
FIG. 9 is an enlarged elevational view of the transistor of FIG. 8 positioned on the substrate of FIG. 7 after interconnection.

A chip-to-substrate fastening operation 110 (see FIG. 2) is performed at this point in the fabrication process. The chip of FIG. 8 is inverted and secured to the substrate in a planar arrangement as shown in FIG. 9. The details of the chip positioning operation are described in a copending application entitled "Methods and Apparatus for Fabricating Microminiature Functional Components" by R. D. McNutt, Ser. No. 300,855, filed Aug. 8, 1963 and assigned to the same assignee as the present invention. Briefly, the chip fastening operation comprises the steps of positioning the substrate and chip devices in a jig which when operated places the devices on the substrate in the precise position. Flux is applied to the fingers when devices are to be fastened. When the jig is operated and the chips are placed in the precise position, the flux acts as a glue to retain the devices at the particular position. The devices and substrate are squeezed together to establish a depression in the solder to prevent relative movement between the device and the substrate during subsequent handling operations. Thereafter, the substrate is subjected to a firing operation and a solder reflow joint 150, as shown in FIG. 9, is established between the device 120 and the substrate 42 at the ball terminals 122. The firing oven is operated in a particular manner to establish the solder reflow joint without melting the metal alloy ball terminal. Accordingly, the ball terminals provide a positive separation between the devices and the substrate to prevent any short circuit therebetween. Additionally, the solder reflow joint establishes a rugged and reliable interconnection between the device and the substrate. The material of the joint is of a nature that no doping of the chip device occurs with subsequent degradation in device operating characteristics.

Figure 10:
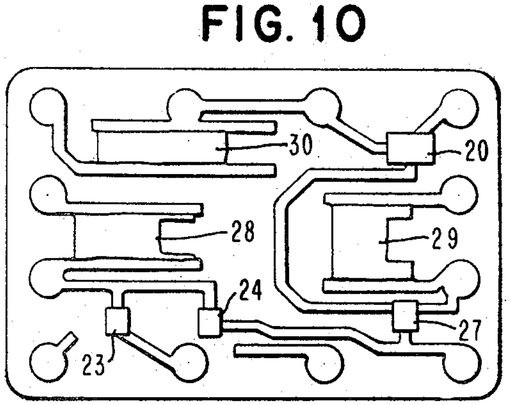
FIG. 10 is a top view of a completed functional component.

FIG. 10 discloses the completed functional component which corresponds to the circuit shown in FIG. 1. Like elements to those shown in FIG. 1 have corresponding reference characters. The excellent thermal conductivity properties of the substrate maintain a substantially isothermal surface. Accordingly, all of the devices operate at a temperature condition which does not adversely affect their performance.

The final operation in fabricating the component is an encapsulation and test opertaion 130 (see FIG. 1). Although none of the circuit elements require a hermetically sealed enclosure, a plastic coating is applied to protect mechanically the elements and reduce corrosion of the solder land under high humidity conditions. The modules are dipped into the plastic and dried in a suitable oven for a period of three hours at 150° C. depending upon the plastic employed. One material found to be satisfactory is a silicone varnish.

Although not required for the circuit shown in FIG. 1, it is sometimes necessary and often desirable to include reactive circuit elements, that is, capacitors and inductors in a functional component. Several modes of fabricating these elements are available. One mode is described in the IBM Technical Disclosure Bulletin, March 1963, page 115. Another mode is a process compatible with the formation of the resistor. Compatible fabrication processes 90 and 100 for inductors and capacitors employed in a functional component, will be described in conjunction with FIGS. 11 and 12.

Figure 11:
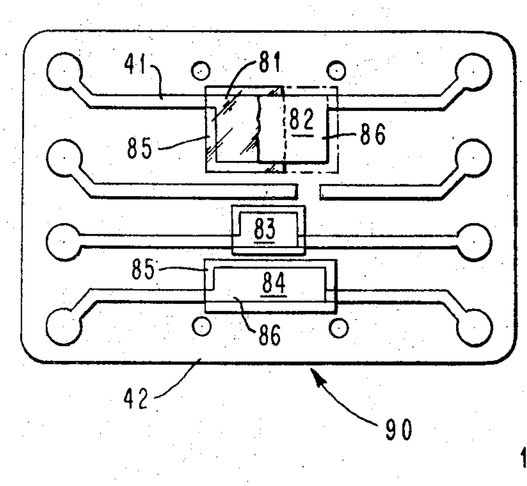
FIG. 11 is a top view of a substrate after printing of a film capacitor.

In FIG. 11, a trio of film capacitors 82, 83 and 84 is shown included in individual two terminal circuit patterns. Each film capacitor is fabricated by conventional silk screening or dipping techniques. For simplicity of description like elements to those described in FIGS. 1 through 7 will have corresponding reference characters.

A gold-platinum conductor 41 on the substrate 42 may be enlarged at particular positions to the order of .020" x .020" to establish first plates 81 for the capacitors 82, 83 and 84. After firing the substrate to form the conductors, each position is ready to receive a dielectric 85 and one or more second plates 86. The dielectric 85 is screened over the first electrode and fired at a temperature sufficient to form a pin hole free, uniform layer. The dielectric may be of a ceramic material that has a high dielectric constant, such as titanium dioxide, barium titanite with any necessary modifiers, such as bismuth stannate, calcium stannate necessary to provide the required dielectric and temperature properties. One or more glasses, for example, a borosilicate or like glass, may act as a binder to provide the proper flow characteristics for the mixture when fired. An organic vehicle, such as pine oil, is also included to provide the required viscosity characteristics for silk screening.

For dielectric compositions of the order of 0–75% titanium dioxide and 100–25% barium borosilicate glass, it appears that a firing temperature about 900° C. for approximately two hours is sufficient to provide the required dielectric characteristics. After the dielectric is fired, a counter electrode 86 of gold and platinum is silk screened thereon and fired at a temperature sufficiently high enough to form a tightly adhering conductive layer. The thickness of the dielectric is of the order of one and a half mils. The total thickness of the capacitor is of the order of three mils thick. Capacitors fabricated in the manner previously described have values from .001 to .5 microfarad per square inch per capacitor layer. Capacitor breakdown voltages of the order of 200 volts have been obtained with high dielectric constant glass-base compositions. The capacitors may also be fabricated to a particular tolerance by a trimming process similar to that described in connection with FIG. 7. To prevent adverse effects to resistors, the capacitors should be fabricated prior to the formation of resistors due to higher and longer firing temperatures required.

Figure 12:
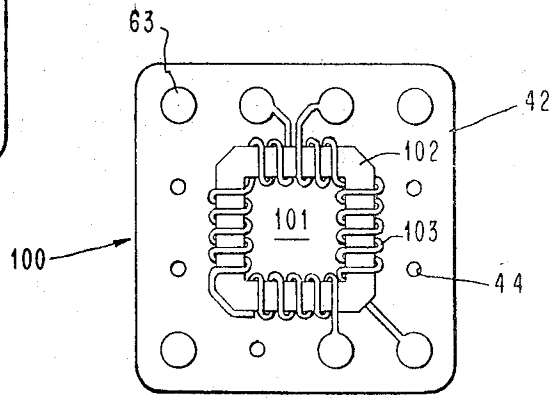
FIG. 12 is a top view of a substrate after printing of a film inductor.

A flat film inductor is formed on a substrate in a manner similar to that indicated for the capacitor described in FIG. 11. FIG. 12 discloses an inductor 101 which is fabricated through a printing, silk screening or extrusion process. A more detailed description of the process as an example, appears in U.S. Pat. 2,506,604 Technical Disclosure Bulletin, vol. 6, No. 4, September 1963, page 76. Conveniently, the bottom or terminal side of the substrate may be employed to receive the inductor. The first step in fabricating the inductor is to print half of coil winding 103. The conductive material is a gold platimum paste which is applied and fired in the manner described in connection with FIG. 3. An appropriate magnetic material 102 is mixed with a glass or glass forming oxide to provide a continuous nonconductive surface and bonding to the substrate when silk screened thereon and fired. A magnetic material found to be suitable was 75% ferrite and 25% glass, for example a borosilicate glass. The magnetic core may consist of one or more layers of magnetic material fired at 900° C. for one hour. The top half of the coil 103 is screened and fired onto the magnetic material to complete the inductor. The top half coil is also gold-platimum material applied and fired in the manner previously described. The inductor is dip-soldered to make contact to the terminal pins as in the case of the resistor and circuit topology.

Inductors fabricated in the manner previously indicated have a magnitude of the order of 100 nanohenries. As in the case of the previous passive elements, the magnitude of the inductor may be readily controlled through a choice of the materials, thicknesses and geometric configurations. It should be noted that although a printed ferrite core inductor has been described, the fabrication process may also be employed to generate other inductor geometric configurations, such as spirals and the like. The inductor may be made with or without a printed ferrite material according to the electrical requirements of the device. In the case of spirals, without the printed magnetic material it may be necessary to have one conductor cross over a second conductor in which case a glass composition may be employed to provide insulation therebetween. A thick glass and a relatively small crossover will reduce the capacitance therebetween to a minimum value.

Summarizing briefly, the present invention has provided a graphic arts process for fabricating functional components. The parameters of the various elements in the component may be readily adjusted by proper selection of materials, thickness of application and other criteria. All steps in the graphic arts process are readily suitable for mass production techniques. The sequence of placing the passive elements and the conducting pattern may be interchanged. For example, the conducting land pattern may be printed and fired or cofired after the placement of the passive elements. The process permits all types of passive components to be fabricated in a compatible process. Both passive and active elements are secured to the same substrate during a continuous process without damage to previously or subsequently connected devices. The functional component has rugged and reliable interconnections between the passive devices and the substrate through the formation of the contacts at the same time the device is fabricaed. Active devices are connected to the substrate through a reliable and readily reproducible solder reflow process. The component is readily connected to utilization means through the pin type terminals. The passive and active elements are substantially impervious to environmental temperatures and humidity conditions.

While the invention has been particularly shown and described with reference to preferred embodiments thereof, it will be understood by those skilled in the art that various changes in form and details may be made therein without departing from the spirit and scope of the invention.

What is claimed is:

1. A process for fabricating functional components including film type passive elements and chip active devices comprising the steps of:

(a) printing on a substrate a unique metallic topology;
(b) firing the substrate to establish a tightly adherent conductive pattern providing areas for emplacement of active and passive elements;
(c) printing between selected areas an impedance composition;
(d) firing the substrate at a time and temperature compatible with the conductive pattern to form a tightly adherent impedance element; and
(e) joining a semiconductor chip device to at least one of the remaining areas to complete an electric circuit, said joining being done for a time period and temperature compatible with the prior firing of the conductive pattern and impedance element.

2. The process defined in claim 1 wherein after firing of the impedance composition terminals are staked in the substrate and together with the metallic topology coated with a metal alloy.

3. The process defined in claim 2 wherein the semiconductor chip device is elevated above the metallic topology.

4. The process defined in claim 3 wherein the semiconductor chip device is joined to the metallic topology by a fused connection.

5. The process defined in claim 4 wherein the fused connection is a solder reflow connection.

6. The process defined in claim 5 wherein the semiconductor chip element includes terminal members which are pressed against the coated metallic topology before fusing to the substrate.

7. The process defined in claim 6 wherein the semiconductor chip is aligned with an area and the metallic topology thereabout and pressed thereagainst before firing.

8. A process for fabricating functional components including film-type passive elements and chip active elements comprising the steps of:

(a) printing on a substrate a unique metallic topology;
(b) firing the substrate to establish a tightly adherent conductive pattern providing areas for emplacement of active and passive elements;
(c) printing between selected are as an impedance composition;
(d) firing the substrate to form a tightly adherent impedance element;
(e) staking a plurality of terminals in the substrate wherein the terminals are connected to the metallic topology;
(f) coating the metallic topology, at least a portion thereof, and staked terminal device with a metal alloy;
(g) joining a semiconductor chip device to at least one of the remaining areas to complete an electric circuit wherein the chip is aligned with an area in the metallic topology;
(h) pressing the chip against the aligned area to establish a cold weld; and
(i) fusing the chip to the aligned area by a solder reflow process whereby the chip is elevated above the topology.

9. The process defined in claim 2 wherein the impedance element is a resistor and the process further includes the step of trimming the resistor while measuring resistor resistivity through selected terminals.

References Cited

UNITED STATES PATENTS

| | | | |
|---|---|---|---|
| 3,159,775 | 12/1964 | Ingraham | 29—626UX |
| 3,207,838 | 9/1965 | McCormack | 29—625X |
| 3,241,011 | 3/1966 | De Mille et al. | 29—589UX |
| 3,255,511 | 6/1966 | Weissenstern et al. | 29—589 |

JOHN F. CAMPBELL, Primary Examiner

W. TUPMAN, Assistant Examiner

U.S. Cl. X.R.

29—627, 630, 593; 117—212; 174—68.5; 317—235; 29—470.1